(12) United States Patent  
Cline et al.

(10) Patent No.: US 6,939,096 B1  
(45) Date of Patent: Sep. 6, 2005

(54) GATE FOR SECURING LOADS IN TRUCKS

(75) Inventors: Stephen Cline, Midway, PA (US); Richard Macklin, Patterson Heights, PA (US)

(73) Assignee: Beemac Trucking Inc., Swickley, PA (US)

( * ) Notice: Subject to any disclaimer, the term of this patent is extended or adjusted under 35 U.S.C. 154(b) by 0 days.

(21) Appl. No.: 10/886,843

(22) Filed: Jul. 7, 2004

(51) Int. Cl.[7] ................................. B60P 7/14
(52) U.S. Cl. ..................... 410/135; 410/130; 410/139
(58) Field of Search ................ 410/129–130, 410/132, 135, 139, 141–142; 296/37.5, 37.6; 224/42.33, 42.34, 42.36; 220/530, 531, 551

(56) References Cited

U.S. PATENT DOCUMENTS

| | | | |
|---|---|---|---|
| 1,349,938 A | * | 8/1920 | Blake |
| 4,880,342 A | * | 11/1989 | Pradovic ..................... 410/121 |
| 2005/0074310 A1 | * | 4/2005 | Davies et al. ............... 410/141 |

* cited by examiner

*Primary Examiner*—Stephen Gordon  
(74) *Attorney, Agent, or Firm*—Richard K. Thomson

(57) ABSTRACT

A scissor gate is provided which has two securement mechanisms enabling it to be stretched across a cargo hold such as a semi tractor trailer box and connected to the E-track on each opposing wall to retain a transported load against shifting.

6 Claims, 3 Drawing Sheets

GATE FOR SECURING LOADS IN TRUCKS

BACKGROUND AND SUMMARY OF THE INVENTION

The present invention is directed to the field of shipping. More particularly, the invention is a load securement gate for use in securing loads in a semi tractor trailer, or the like.

A major problem in the shipping industry is the shifting of loads. Items and boxes rattling around in the back of a carrier not only risks damage to the merchandise, shifting of the weight in a turn can unbalance the load to such a degree that the tractor trailer rolls over threatening the life of the driver and others who may be totally unaware they are in harm's way.

One solution that has been advanced to deal with this problem is the use of straps. Typically, the straps have one or more connectors which engage the E-track positioned along the sides of the trailer box and a ratcheting device to allow tightening about the item. While this technique is effective in securing a single item, it is not the solution for securing a stack of boxes or other compact load.

The gate of the present invention offers an effective solution to this problem. The load securement gate of the present invention available from Beemac Trucking, Inc., comprises a first vertically extending support; a second vertically extending support spaced from the first support; an expandible scissor gate pivotally attached to each of said first and second vertical support at at least two points; first securement means attached to said first vertically extending support to secure it to a first e-track on a first side of a cargo transport; second securement means attached to said second vertically extending support to secure it to a second e-track on a second side of the cargo transport. This gate can be utilized to secure a stack of boxes or other compact load in place to eliminate shifting of any and all of the components that make up the load.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
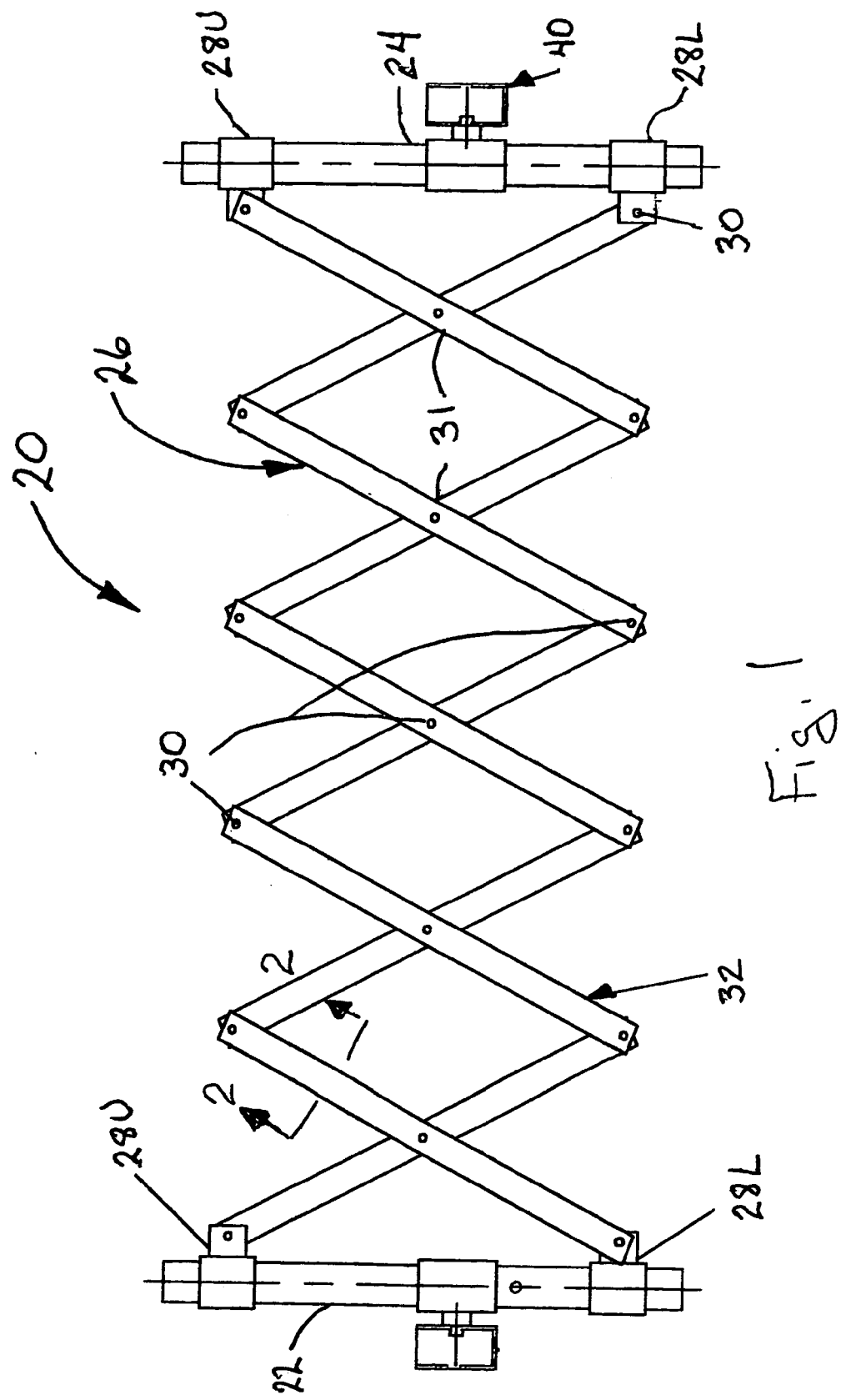
FIG. 1 is a front view of a first embodiment of the cargo gate of the present invention.
Figure 2:
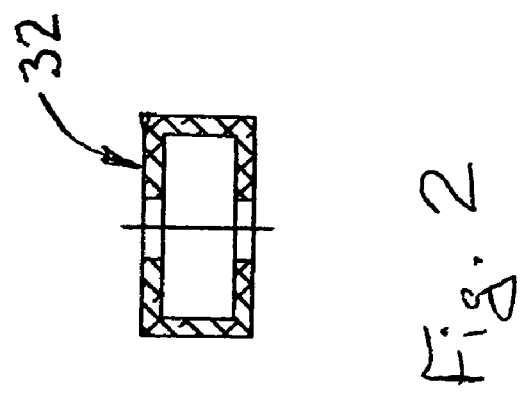
FIG. 2 is a cross-sectional view of a gate struts as seen along line 2—2 in FIG. 1.

A first preferred embodiment of the cargo gate of the present invention is depicted in FIG. 1 generally at 20. Cargo gate 20 comprises a first vertically extending support post 22 on a first side of the gate and a second vertically extending support post 24 on the opposite side. Scissor gate 26 extends between support posts 22, 24 and are pivotally secured to each one thereof by a pair of adjustable mounting tubes 28U and 28L and shoulder bolts 30. Scissor gate 26 is made up a series of rectangular box beam struts 32 (see FIG. 2) interconnected at their ends and at a central point 31 by shoulder bolts 30. While structural elements 22, 24, 32 may be made of a metal, such as aluminum or steel, aluminum is preferred to reduce weight without compromising strength.

Figure 3:
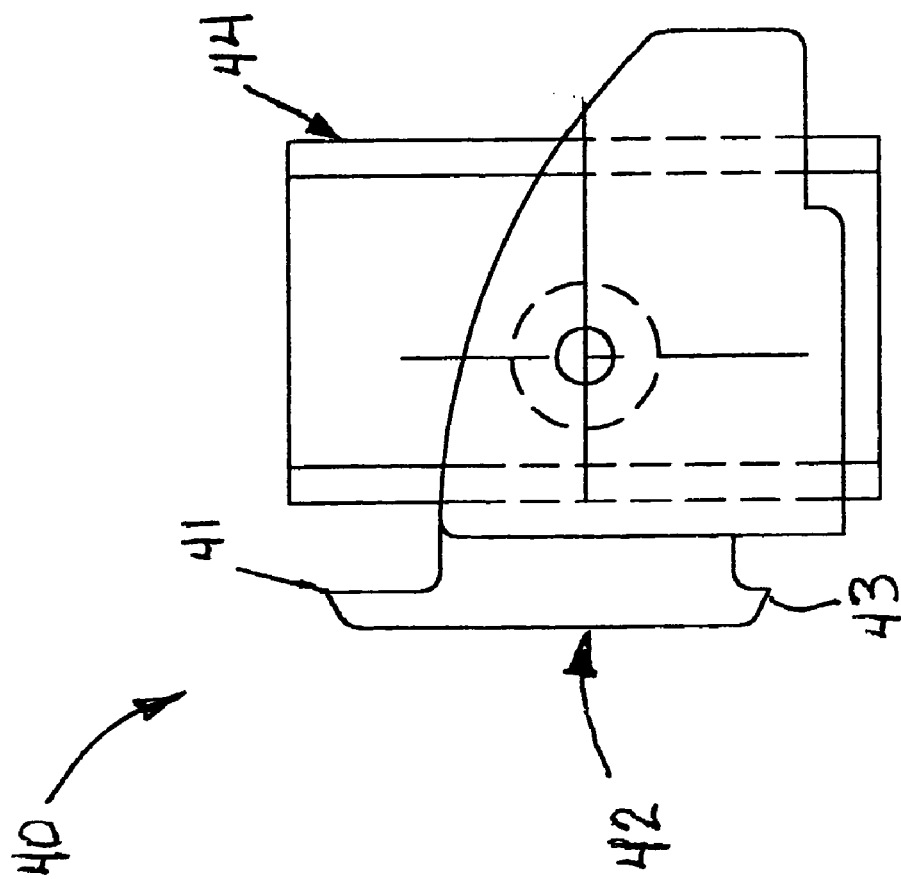
FIG. 3 is a detailed side view of a latching mechanism which may be used with the gate of the present invention.

Securement means 40 is rotationally attached to each support post 22, 24. While any of a number of securement means are available (U.S. Pat. Nos. 5,807,047 and 6,739,811, for example, teach connectors for E-track), the securement means 40 of the preferred embodiment is an E-track locking mechanism available from Kinedyne Corporation of Lawrence Kans., having part no. 1845. As depicted in FIG. 3, latching mechanism 42 is pivotally mounted on sleeve 44. To use, the top edge 41 of latch mechanism 42 is inserted in the E-track, pivoted upwardly until the lower edge 43 clears the opening and then the latch mechanism 42 is dropped into the E-track opening.

Figure 4:
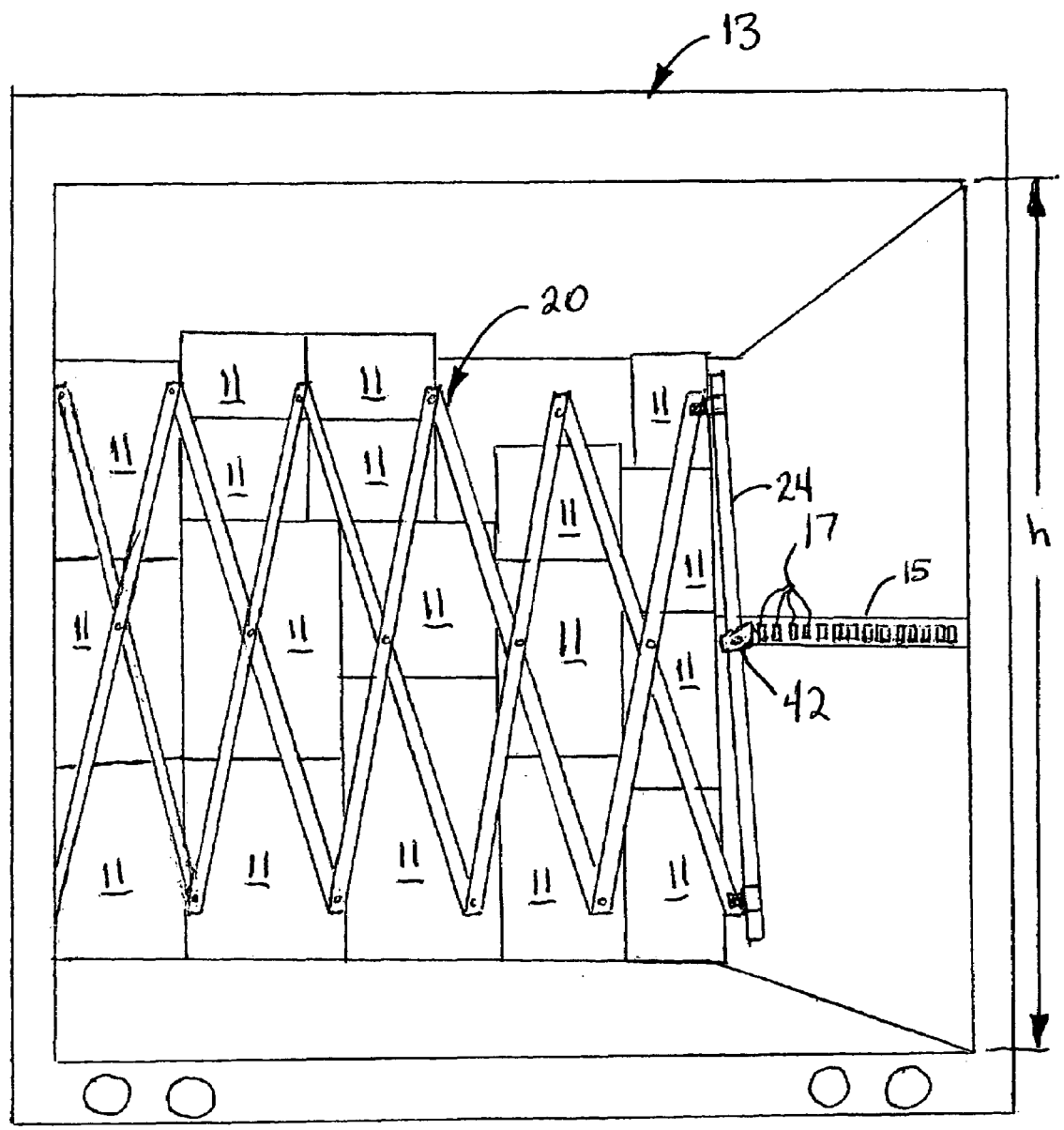
FIG. 4 is a schematic depiction of the gate in use in a cargo transport such as a semi truck trailer box.

The cargo restraining gate 20 of the present invention is depicted in use in FIG. 4. After boxes 11 are stacked into a compact array, gate 20 is positioned in the semi tractor trailer box 13 by pivotally installing latching mechanism 42 attached to support posts 22,24 in an appropriate opening 17 in E-track 15. Preferably, securement gate 20 extends at least 80% of the height of the conventional truck box height 'h' to maximize its effectiveness in restraining the load, regardless of its size.

Various changes, alternatives and modifications will become apparent to one of ordinary skill in the art following a reading of the foregoing specification. It is intended that any such changes, alternatives and modifications as fall within the scope of the appended claims be considered part of the present invention.

We claim:

1. A load securement gate device for use in transporting cargo comprising
   a) a first vertically extending support post;
   b) a second vertically extending support post spaced from said first support post;
   c) an expandable scissor gate pivotally attached to each of said first and second support posts at at least two points;
   d) first securement means attached to said first vertically extending support post to secure it to a first e-track on a first side of a cargo transport;
   e) second securement means attached to said second vertically extending support post to secure it to a second e-track on a second side of the cargo transport.

2. The load securement gate device of claim 1 wherein said expandable scissor gate extends over at least 80% of a height of the cargo transport.

3. The load securement gate device of claim 1 wherein said expandable scissor gate comprises a plurality of pivotally interconnected strut members.

4. The load securement gate device of claim 3 wherein each strut member comprises a rectangular box beam.

5. The load securement gate device of claim 1 wherein said gate device is made of metal.

6. The load securement gate device of claim 5 wherein the metal is selected from the group consisting of steel and aluminum.

* * * * *